United States Patent [19]

Suga

[11] 4,185,920
[45] Jan. 29, 1980

[54] COLOR DISPLAYING APPARATUS

[76] Inventor: Nagaichi Suga, 32 Banshu-cho, Shinjuku-ku, Tokyo, Japan

[21] Appl. No.: 910,948

[22] Filed: May 30, 1978

[30] Foreign Application Priority Data

Oct. 13, 1977 [JP] Japan .............................. 52-121930

[51] Int. Cl.² .............................................. G01J 3/50
[52] U.S. Cl. ..................................... 356/406; 356/402
[58] Field of Search ....................... 356/402, 405–407; 250/226; 364/526

[56] References Cited

U.S. PATENT DOCUMENTS

| | | | |
|---|---|---|---|
| 3,330,904 | 7/1967 | Gebel | 356/405 X |
| 3,504,980 | 4/1970 | Bentley et al. | 356/406 X |
| 3,531,208 | 9/1970 | Ward | 356/406 X |

Primary Examiner—F. L. Evans
Attorney, Agent, or Firm—Wenderoth, Lind & Ponack

[57] ABSTRACT

The present invention is a color displaying apparatus for display and comparison of the chromaticity and brightness of colors. The chromaticity chart and brightness scale positions of colors having known x-y-Y values set into the apparatus are automatically displayed. In conjunction with a color meter, the chromaticity chart and brightness scale positions of an unknown sample color are automatically displayed. Using graphic memory means and numerical display devices, the chromaticity chart and brightness scale positions and the x-y-Y values of two or more colors can be compared.

6 Claims, 7 Drawing Figures

COLOR DISPLAYING APPARATUS

BACKGROUND OF THE INVENTION

Colors can be represented, as described in JISZ8701 "METHOD OF REPRESENTING COLORS BY TWO DIMENSIONAL FIELD XYZ SYSTEM," by numerical values of x, y and Y. However, although color can be numerically represented by this method, it is quite difficult to understand what color is meant by these numerical values.

Conventionally, a chromaticity chart consisting of x-y coordinates has been used to enable a prompt understanding of the nature of the color cited. Paper strips of colors corresponding to the x and y values of these coordinate points are attached to a number of coordinate points on the chart. In order to appreciate the nature of a color reference, the x and y values of the color cited are manually located on the chromaticity chart, and the subject color can be judged from the color of the paper strip attached to the located coordinate point or estimated from the colors of the paper strips around the located point.

SUMMARY OF THE INVENTION

The present invention is concerned with a color displaying apparatus which can automatically display the position of a color on the chromaticity chart, so as to eliminate the above described manual operation for converting the numerical values into the actual color.

An object of the present invention is to provide an automatic display of the position of a color on the x-y chromaticity chart and the Y brightness scale from given values of x, y and Y.

Another object of the present invention is to provide an automatic display of the position of a color on the x-y chromaticity chart and the Y brightness scale from the measured values of x, y and Y provided by a color meter.

A further object of the present invention is to provide a graphic memory means to memorize the position of a color on the x-y chromaticity chart and the Y brightness scale in order to enable graphic comparisons of the positions of two or more colors.

BRIEF DESCRIPTION OF THE DRAWINGS

The present invention will become readily apparent from the following detailed description taken in conjunction with the accompanying drawings in which.

DETAILED DESCRIPTION OF THE PREFERRED EMBODIMENT

The color displaying apparatus of this invention consists primarily of a display board unit and a control unit.

More specifically, in order to display a color represented by the known numerical values $x_o$, $y_o$ and $Y_o$ these values are put into a numerical value display unit of the control unit by a suitable operation such as setting dial knobs or the like, and the chromaticity and the brightness of the color are displayed automatically on the x-y chromaticity chart and the Y brightness scale on the display board of the display board unit, by means of light spots from the back side of the display board hereinafter described, at positions corresponding to the values $x_o$, $y_o$ and $Y_o$, respectively.

In order to display an unknown color, i.e. a color whose x, y and Y values are unknown, the numerical values (e.g. $x_1$, $y_1$, $Y_1$) of the color may be measured by a color meter, and the output control signal from the color meter may actuate the display units to display the values $x_1$, $y_1$ and $Y_1$, respectively. At the same time, the control signals corresponding to the values $x_1$, $y_1$ and $Y_1$ are used to display the chromaticity and the brightness, by means of the light spots, in the same manner as for a known color.

The display board of the display board unit is backed with a ferromagnetic gauze wire. The laminated structure of the display board and the ferromagnetic gauze wire is further sandwiched between transparent glass or plastic plates, so that magnet pieces can be attached to any point on the front side of the display board.

Therefore, by attaching magnet pieces to the display board at the positions of the light spots for a color, the qualities of a plurality of colors, i.e. tone, cleanness and brightness, are conveniently recorded on the display board, for a plain and easy comparison of these qualities with one another, on the x-y chromaticity chart and on the Y-brightness scale.

Thus, according to the invention, there is provided a color displaying apparatus which can greatly contribute to the management of colors and to improve the human color perception.

Hereinafter, a preferred embodiment of the invention will be described in conjunction with the attached drawings.

Figure 1:
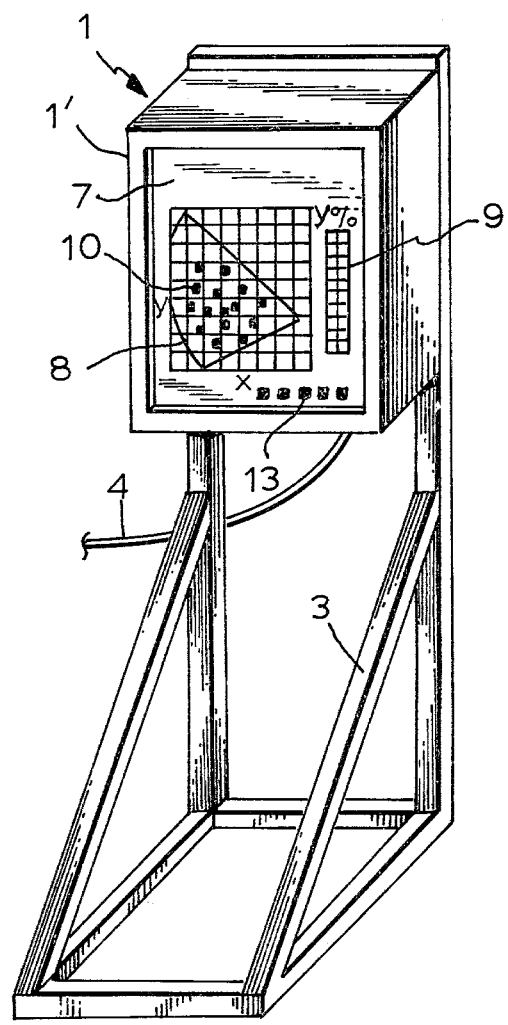
FIG. 1 is a perspective view of a display board unit.
Figure 2:
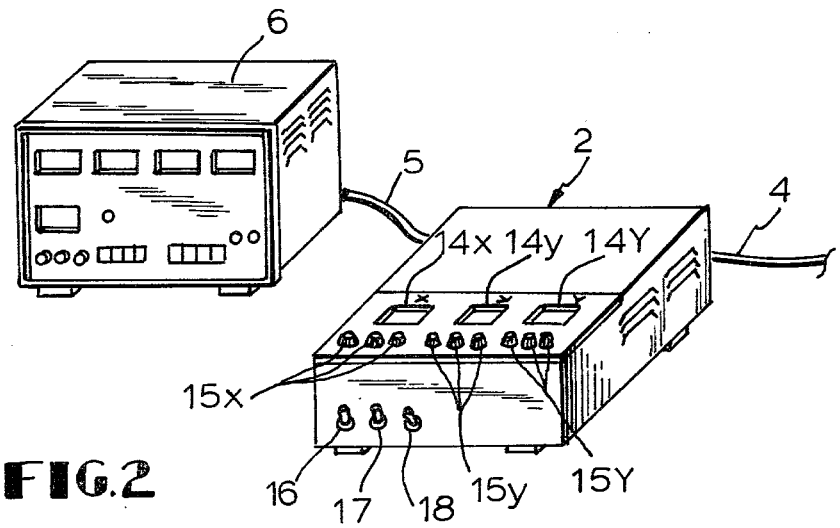
FIG. 2 is a perspective view of a control unit and an optional color meter.

Referring at first to FIGS. 1 and 2, the apparatus embodying the present invention includes a display board unit generally designated at 1 and a control unit generally designated at 2. The display board unit 1 is supported by column 3 and is electrically connected to the control unit 2 through cable 4. The control unit 2 may be further electrically connected to a color meter 6, which is to be used selectively, through cable 5.

Display board 7' of the display board assembly 7 on the front face of the display board unit 1 is preferably made of translucent paper or plastic, and carries a non-colored chromaticity chart 8 having x and y cordinate axes, as well as Y axes brightness scale 9.

On the surface of the chromaticity chart 8, there are selected a number of x and y coordinate points to which colored strips 10 of paper or the like having colors corresponding to respective values of x and y are attached.

Figure 3:
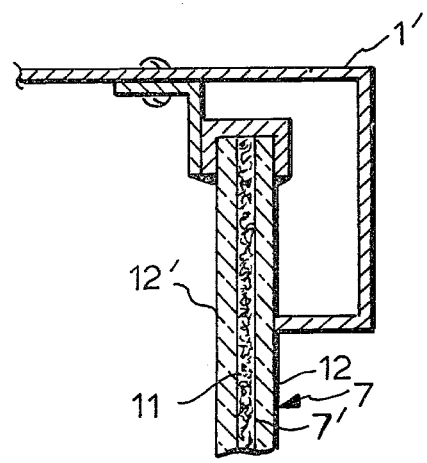
FIG. 3 is a sectional view of a display board unit.

As shown in FIG. 3, the display board assembly 7 consists of the display board 7' lined with a gauze wire 11 of a ferromagnetic material. The superimposed display board 7' and the gauze wire 11 are sandwiched between a pair of transparent glass or plastic plates 12 and 12' which are secured at their peripheral edges to a frame 1' of the aforementioned display board unit 1.

Due to the presence of the ferromagnetic gauze wire 11, magnet pieces 13 of a size substantially equal to that of the light spot can be attached to the blank portion of the front glass plate 12.

On the top panel of the control unit 2, there are provided display units 14x, 14y and 14Y for displaying the numerals of x, y and Y, as well as adjusting knobs 15x, 15y and 15Y for setting the numerals of these display units 14x, 14y and 14Y. On the front fact of the control unit 2, are disposed a power source switch 16, a switch 17 for a light source which will be described later, and a triple pole change-over switch 18.

Figure 4:
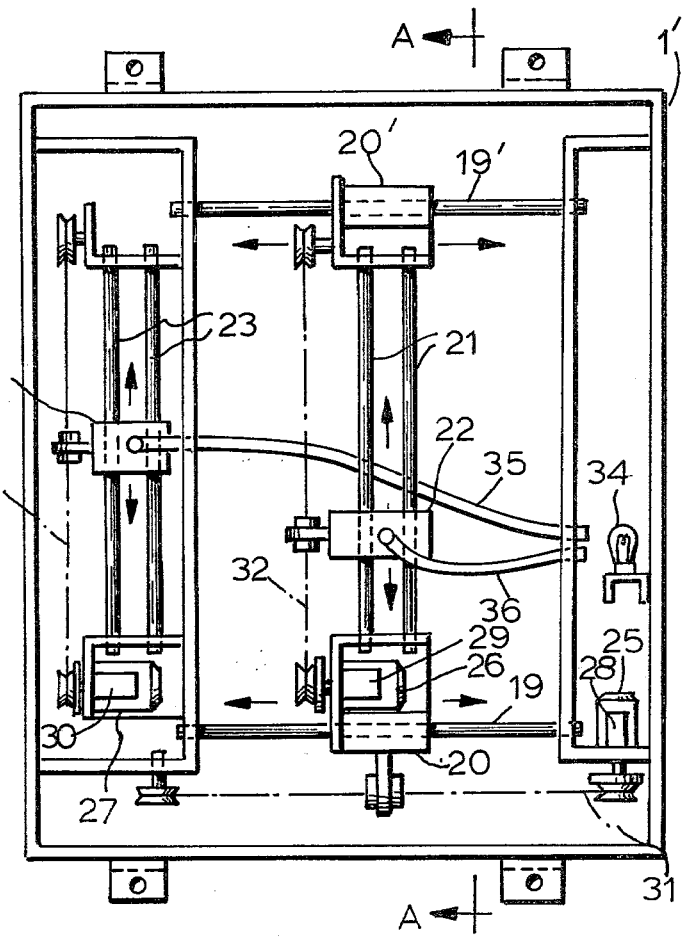
FIG. 4 is a back elevational view of a coordinate point tracing mechanism disposed in the display board unit.
Figure 5:
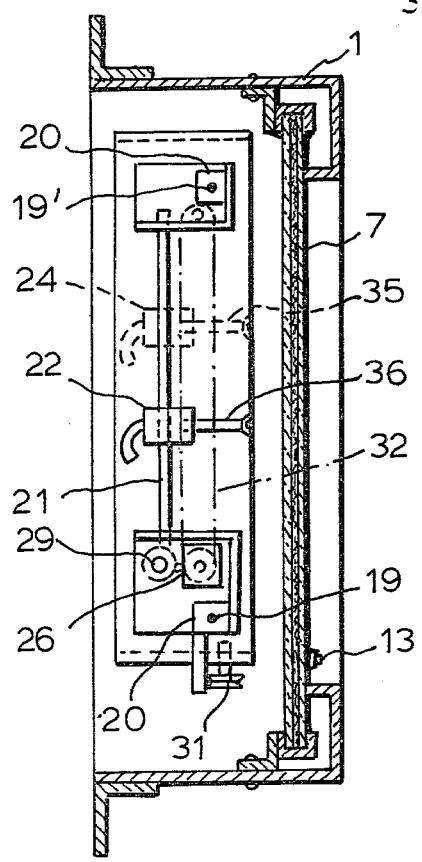
FIG. 5 is a sectional view taken along the line A—A of FIG. 4.
Figure 6:
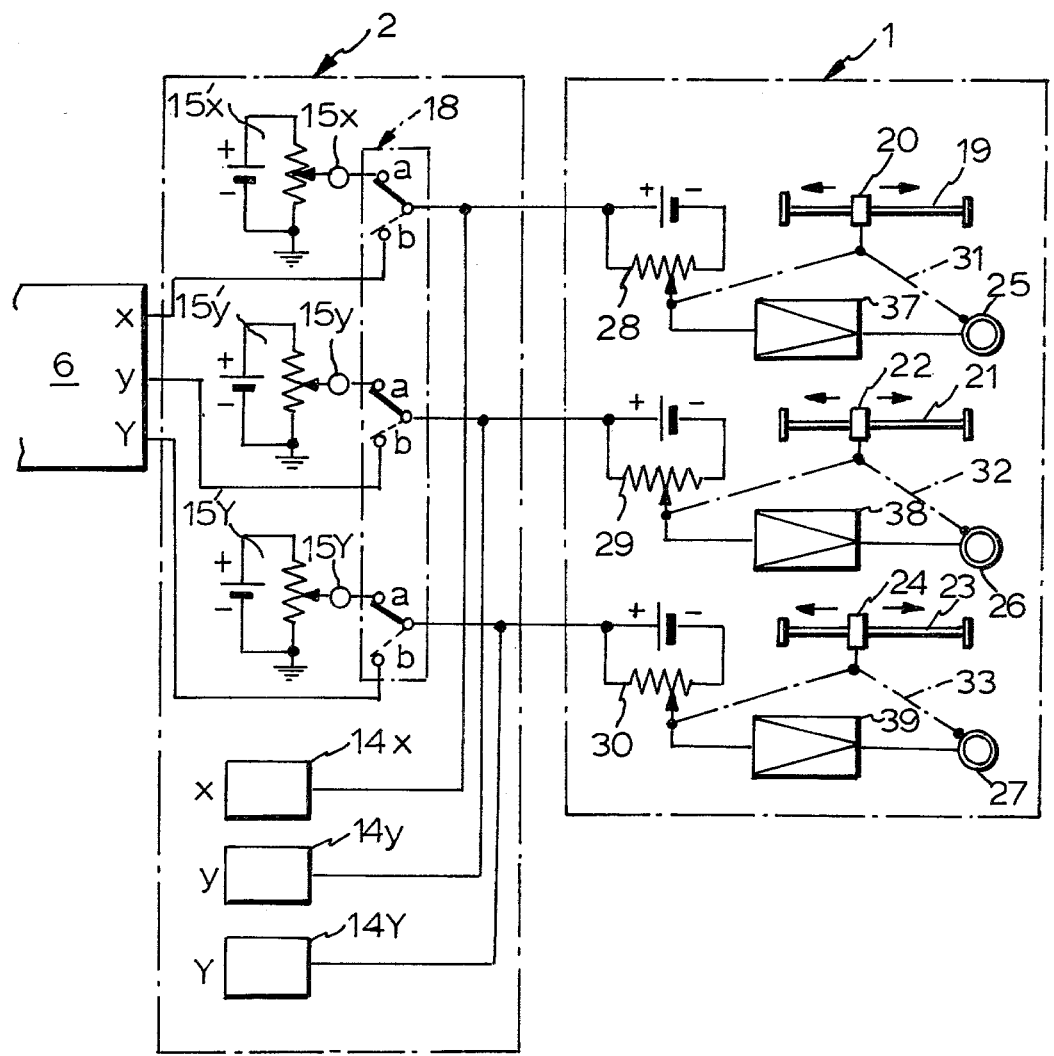
FIG. 6 is a circuit diagram of the whole color display apparatus of the invention.

Hereinafter, the construction and operation of one embodiment of a coordinate point tracing mechanism incorporated in the display board unit 1 will be described with reference to FIGS. 4, 5 and 6.

At the back side of the display board assembly 7, a pair of x axis positioning members 19 and 19' are disposed at the upper and lower ends of the display board assembly 7 so as to extend in parallel with each other. These x axis positioning members carry x axis slides 20 and 20' for free sliding movement in the direction of the x axis or axis of abscissa. A pair of y axis positioning members 21 are carried at their upper and lower ends by the x axis slides 20 and 20', and carry a y axis slide 22 for free sliding movement in the direction of the y axis or axis of ordinate. A pair of Y axis positioning members 23 are disposed at one side of the display board assembly 7 and carry a Y axis slide 24 for free sliding movement along the Y axis or axis of ordinate. These slides are adapted to be driven by an automatic balancing servo mechanism of the potentiometer type.

More specifically, the driving mechanism includes servo motors 25, 26 and 27 for driving the slides 20, 22 and 24, potentiometers 28, 29 and 30 which are geared to these servo motors and adapted to rotate with these servo motors, and wires 31, 32 and 33 equipped with pulleys for transmitting the rotation of the servo motors to the corresponding slides.

The servo motors 25, 27 and the potentiometers 28, 30 are suitably secured to the frame 1' of the display board assembly 7, while the servo motor 26 and the potentiometer 29 are secured to the slide 20.

Therefore, as generally described before, in case of a color having known values represented by $x_o$, $y_o$ and $Y_o$, these values are converted into voltage controlling signals by setting means (15'x, 15'y and 15'Y of FIG. 6) which include a constant voltage source, a rotary switch and a potential dividing resistor, through adjustment by the adjusting knobs 15x, 15y and 15Y, and are displayed digitally on the display units 14x, 14y and 14Y. In the case of an unknown color value a color meter may be used. A triple pole change-over switch 18 is switched from terminal a for the setting means to terminal b for the color meter 6, so that the color values $x_i$, $y_i$ and $Y_i$ measured by the color meter are displayed on the display unit. At the same time, voltage control signals corresponding to these values are generated and applied to the respective potentiometers 28, 29 and 30 in a reverse polarity of (+) and (−), so as to produce potential differentials. These potential differentials are amplified by the respective amplifiers 37, 38 and 39 which are housed in the control unit 2, and are applied to the corresponding servo motors 25, 26 and 27, so as to rotate them until the potential differentials are completely negated. As a result of the rotation of the servo motors, the slides 20, 22 and 24 slide along the respective axes 19, 21 and 23. Consequently, the slide 22 comes to occupy a position on the chromaticity chart 8 corresponding to $x_o$, $y_o$ or $x_1$, $Y_1$, so as to represent the corresponding color, while the slide 24 occupies a position which represents a brightness corresponding to $Y_o$ or $Y_1$, on the Y axis.

The positions of the slides 22 and 24 are invisible from the front side of the display board assembly 7. To make them visible, light spot means located close to the back side of the display board 7' are carried by the respective slides 22 and 24, so that the light emitted from the light spot means may be transmitted through the display board 7' to the front face of the latter, thereby to display the positions set by means of light spots.

Various types of light spot means are adoptable. For instance, the light spot means may incorporate fiber scopes which are known per se. In this case, optic fibers 35 and 36 are so arranged that one of their ends are opposite to a light source 34 which is typically a tungsten lamp, while the other ends are secured to the slides 22 and 24 so as to closely face the back side of the display board 7'. Alternatively, the slides 22 and 24 can carry independent light spot means consisting of a light source and a lens system.

When it is desired to compare more than two colors with one another, for various purposes such as selection of a desired color, adjustment of color to a desired one, color turning of a lot of goods, test or inspection of degradation of color due to aging, or checking the fluctuation of the color of materials, the coordinates of the colors can be memorized by putting magnet pieces at the respective color positions on the display board 7'.

Figure 7:
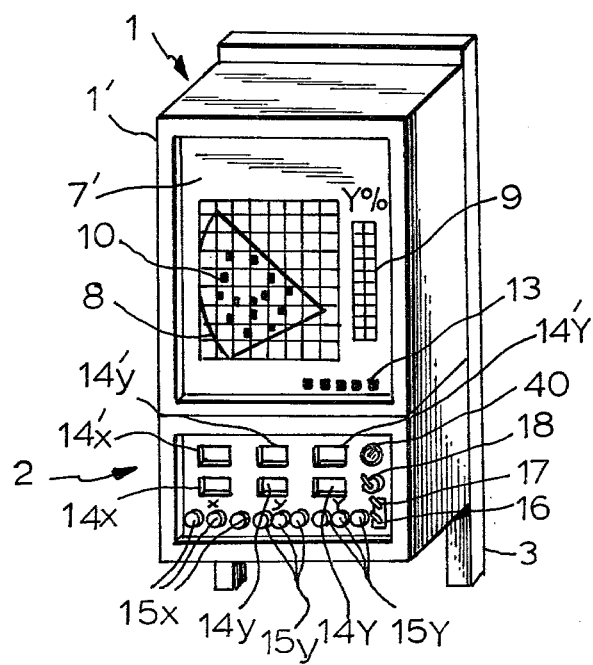
FIG. 7 is a perspective view of another embodiment of the invention in which the display board unit and the control unit are combined in one unit.

Hereinafter, another embodiment of the invention will be described with specific reference to FIG. 7.

This color display device also has a display board unit and a control unit. However, in this case, these units are unitarily combined with each other so as to have a common front surface. In addition, another set of display units 14'x, 14'y and 14'Y are installed along with the display units 14x, 14y and 14Y, for memorizing the x, y and Y values of a color which is the reference or standard of the color comparison. The display units 14'x, 14'y and 14'Y are not interlocked with the light spot display mechanism. The arrangement is such that the x, y and Y numerals displayed on the lower display units 14x, 14y and 14Y by the operation of the light spot display mechanism are transferred to the upper display units 14'x, 14'y and 14'Y, when a push button switch 40 is depressed.

In the case of a comparison of two known colors, e.g. $x_o$, $y_o$ and $Y_o$, and $x'_o$, $y'_o$ and $Y'_o$, at first the adjusting knobs 15x, 15y and 15Y are operated to put the values $x_o$, $y_o$ and $Y_o$ on the lower display units and to cause a light spot display on x-y chromaticity chart, as well as on the Y brightness scale. Then, magnet pieces are put on the respective light spots. Then, the push button switch 40 is depressed, so that the values $x_o$, $y_o$ and $Y_o$ are transferred to the upper display units 14'x, 14'y and 14'Y, respectively. The values displayed on the upper display units are preserved without change, even when the numerals displayed on the lower display units are changed.

Subsequently, the adjusting knobs are operated again to display the values $x'_o$, $y'_o$ and $Y'_o$ on the lower display units 14x, 14y and 14Y, as well as to cause a light spot display on the x-y chromaticity chart and the Y brightness scale. Then, the positional and numerical relationships of the two colors are obviously understood from the light spot display, the magnet pieces and the numerals displayed on the upper and lower sets of display units.

A comparison of unknown colors can be made almost in the same manner as above by employing a color meter. Namely, the color meter is used to measure the values of the first color. The measured values $x_1$, $y_1$ and $Y_1$ are displayed in the lower display units $14x$, $14y$ and $14Y$, as well as on the chromaticity chart and the brightness scale by light spots. After putting magnet pieces on the light spots, the push button 40 is depressed to transfer the displayed numerals to the upper display units $14'x$, $14'y$ and $14'Y$. Subsequently, the second color is measured by the color meter and the values are displayed on the lower display units, as well as on the chromaticity chart and the brightness scale, for an easy comparison with the first color values and positions.

Thus the apparatus may be employed advantageously either with or without a color meter depending on the application desired.

As has been stated, for the management or control of color, at first the values and the positions of a reference color, which is the standard of the color management, are preserved on the upper display units, and on the chart and scale by means of magnet pieces, and then the color to be compared with the reference color is displayed on the lower display units, and on the chart and scale by light spots. Therefore, the numerical relationship between two colors is obvious from the comparison of numerical displays on the upper and lower display units, while the positional relationship between the two colors can easily be grasped by a comparison of the positions of the light spots with those of the magnet pieces.

Thus, according to the invention, in sharp contrast to the conventional technique in which the color and brightness are marked by hand on the x-y chromaticity chart and the Y brightness scale, the color values and the brightness values are automatically and accurately marked on the charomaticity chart and the brightness scale, by means of the light spots in correspondence with control signals corresponding to the numerical values of x, y and Y displayed on the display units of the control unit, rapidly and accurately. In addition, the positions of the display given by the light spots are conveniently memorized for a comparison of colors.

What is claimed is:

1. A color displaying apparatus comprising:
   a display board assembly having a first transparent plate, a translucent display board on which an x-y chromaticity chart and a Y brightness scale are marked, a ferromagnetic wire screen and a second transparent plate clamped together as a unit;
   a plurality of magnet pieces for adhereing to said display board assembly by attraction to said ferromagnetic wire screen;
   a coordinate signal generating means having an x axis signal generating means for generating an x axis signal in response to manual control by an operator, a y axis signal generating means for generating a y axis signal in response to manual control by an operator and a Y axis signal generating means for generating a Y axis signal in response to manual control by an operator;
   a digital display means receiving said x axis signal, said y axis signal and said Y axis signal having an x axis display means for displaying said x axis signal, a y axis display means for displaying said y axis signal and a Y axis display means for displaying said Y axis signal;
   a x-y chromaticity coordinate setting means receiving said x axis signal and said y axis signal, located on the reverse side of said display board assembly, having a first light spot means for producing on said translucent display board a light spot visible from the front of said display board assembly at a position relative to said x-y chromaticity chart of said translucent display board corresponding to said x axis signal and said y axis signal;
   a Y brightness scale setting means receiving said Y axis signal, located on the reverse side of said display board assembly, having a second light spot means for producing on said translucent display board a light spot visible from the front of said display board assembly at a position relative to said Y brightness scale of said translucent display board corresponding to said Y axis signal.

2. A color displaying apparatus as claimed in claim 1 wherein said x-y chromaticity coordinate setting means comprises:
   a pair of x axis positioning means located on the reverse side of said display board assembly above and below said x-y chromaticity chart and parallel to the x axis of said x-y chromaticity chart;
   a pair of x axis slide means one mounted on each of said pair of x axis positioning means for sliding along said x axis positioning means;
   a pair of y axis positioning means each mounted at one end thereof to each of said pair of x axis slide means and parallel to the y axis of said x-y chromaticity chart;
   a first slide means mounted on said pair of y axis positioning means for sliding along said pair of y axis positioning means;
   an x axis servomechanism for receiving said x axis signal and sliding said pair of x axis slide means to a position corresponding to said x axis signal; and
   a y axis servomechanism for receiving said y axis signal and sliding said first slide means to a position corresponding to said y axis signal.

3. A color displaying apparatus as claimed in claim 1 wherein said Y brightness scale setting means comprises:
   a pair of Y axis positioning means located on the reverse side of said display board assembly on either side of said Y brightness scale and parallel to the Y axis of said Y brightness scale;
   a second slide means mounted on said pair of Y axis positioning means for sliding along said pair of Y axis positioning means; and
   a Y axis servomechanism for receiving said Y axis signal and sliding said second slide means to a position corresponding to said Y axis signal.

4. A color displaying apparatus as claimed in claim 1 wherein said x axis signal generating means, said y axis signal generating means and said Y axis signal generating means each comprise:
   a constant voltage source for producing a constant voltage; and
   a potentiometer connected across said constant voltage source having a sliding tap for producing a voltage which is a variable percentage of said constant voltage.

5. A color displaying apparatus as claimed in claim 1 further comprising:
- a second digital display means having an x axis display means for displaying said x axis signal, a y axis display means for displaying said y axis signal and a Y axis display means for displaying said Y axis signal and;
- a selective signal transfer means connected to said digital display means and said second digital display means for transferring to said second digital display means and said x axis signal, said y axis signal and said Y axis signal applied to said digital display means when actuated.

6. A color displaying apparatus as claimed in claim 1, further comprising:
- a color meter for receiving a sample, for measuring the x-y chromaticity and Y brightness of the sample and for generating an x axis signal, a y axis signal and a Y axis signal corresponding to the measured chromaticity and brightness; and
- a signal source selection means connected to said coordinate signal generating means, said color meter, said digital display means, said x-y chromaticity coordinate setting means and said Y brightness scale setting means for selectively passing the x axis signal, the y axis signal and the Y axis signal of one of said coordinate signal generating means and said color meter to said digital display means, said x-y chromaticity coordinate setting means and said Y brightness scale setting means.

* * * * *